United States Patent [19]

Taniguchi et al.

[11] Patent Number: 4,941,736
[45] Date of Patent: Jul. 17, 1990

[54] FERROELECTRIC LIQUID CRYSTAL DEVICE AND DRIVING METHOD THEREFOR

[75] Inventors: Osamu Taniguchi, Kawasaki; Junichiro Kanbe, Yokohama; Shinjiro Okada, Kawasaki; Akira Tsuboyama, Tokyo; Masahiko Enari, Yokohama, all of Japan

[73] Assignee: Canon Kabushiki Kaisha, Tokyo, Japan

[21] Appl. No.: 225,827

[22] Filed: Jul. 29, 1988

Related U.S. Application Data

[63] Continuation-in-part of Ser. No. 854,583, Apr. 22, 1986, abandoned, and a continuation-in-part of Ser. No. 170,109, Mar. 11, 1988, abandoned, which is a continuation of Ser. No. 28,130, Mar. 19, 1987, abandoned.

[30] Foreign Application Priority Data

| Apr. 23, 1985 | [JP] | Japan | 60-087084 |
| Apr. 24, 1985 | [JP] | Japan | 64-087830 |
| Apr. 24, 1985 | [JP] | Japan | 60-087829 |
| Apr. 24, 1985 | [JP] | Japan | 64-087828 |
| Mar. 24, 1986 | [JP] | Japan | 61-065054 |
| Mar. 25, 1986 | [JP] | Japan | 61-067585 |
| Aug. 25, 1987 | [JP] | Japan | 62-198408 |

[51] Int. Cl.$^5$ ............................................. G02F 1/13
[52] U.S. Cl. ........................ 350/350 S; 350/333; 350/337
[58] Field of Search ............ 350/333, 334, 337, 340, 350/341, 350 S

[56] References Cited

U.S. PATENT DOCUMENTS

| 4,561,726 | 12/1985 | Goodby et al. | 350/341 |
| 4,709,994 | 12/1987 | Kanbe et al. | 350/350 S |
| 4,712,873 | 12/1987 | Kanbe et al. | 350/337 |
| 4,715,688 | 12/1987 | Harada et al. | 350/350 S |
| 4,812,018 | 3/1989 | Kobayashi | 350/350 S X |

FOREIGN PATENT DOCUMENTS

| 0149398 | 7/1985 | European Pat. Off. | 350/350 S |
| 0124030 | 5/1988 | Japan. | |

Primary Examiner—Stanley D. Miller
Assistant Examiner—Huy K. Mai
Attorney, Agent, or Firm—Fitzpatrick, Cella, Harper & Scinto

[57] ABSTRACT

A ferroelectric liquid crystal device comprising: a pair of substrates each having a plurality of electrodes oppositely spaced from each other and intersecting with each other, and a ferroelectric liquid crystal layer disposed between the substrates and having a thickness small enough to release a helical structure in the absence of an electric field, a pixel being formed at each intersection of the opposite electrodes formed on the pair of substrates while leaving non-pixel portions at which the opposite electrodes do not face each other. The ferroelectric liquid crystal yields two stable orientation states providing two average molecular axes forming an angle $2\theta$ therebetween under no electric field. The ferroelectric liquid crystal yields two states providing two average molecular axes forming an angle 2 H therebetween. The ferroelectric liquid crystal at the non-pixel portions forms an orientation state providing an average molecular axis forming an angle $\theta$ or $-\theta$.

36 Claims, 11 Drawing Sheets

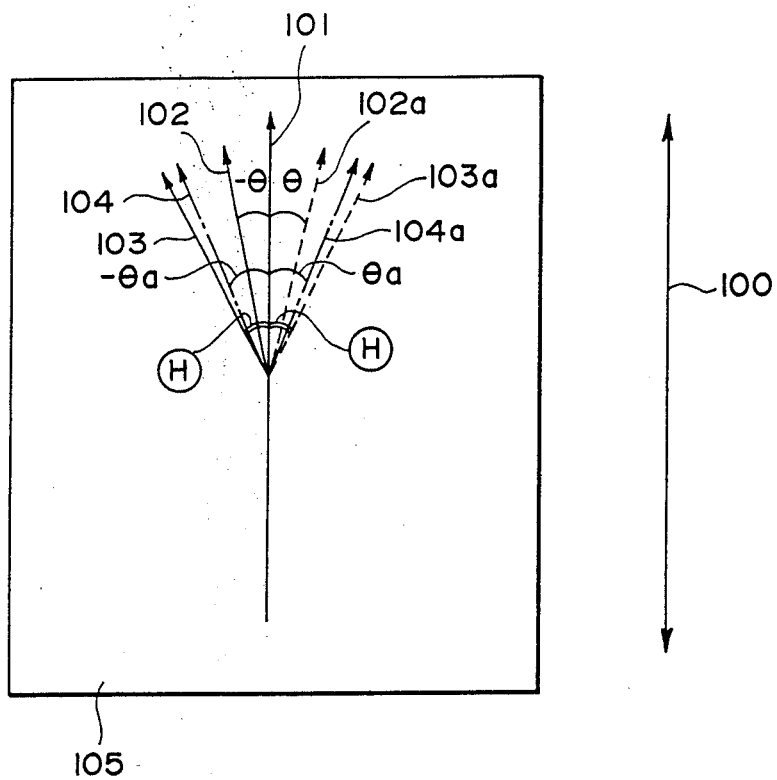
F I G. 1

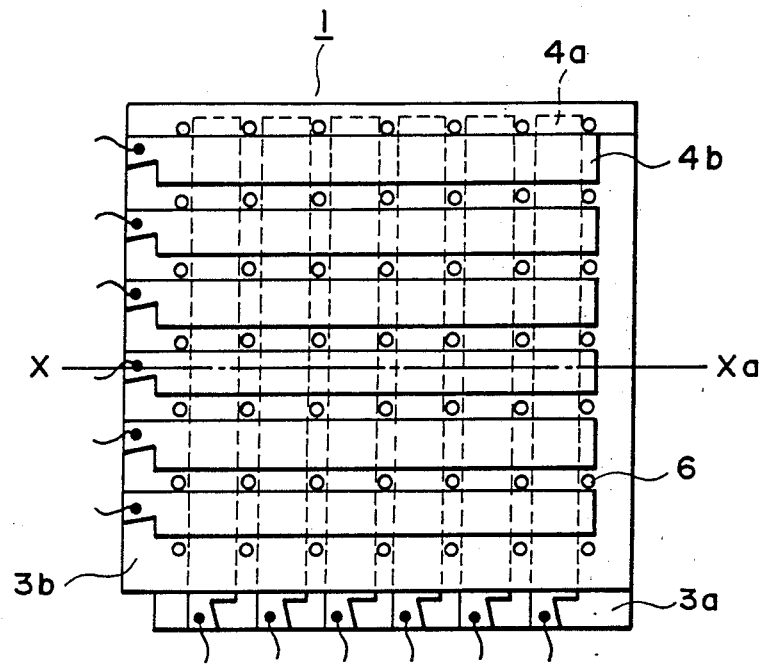
F I G. 2
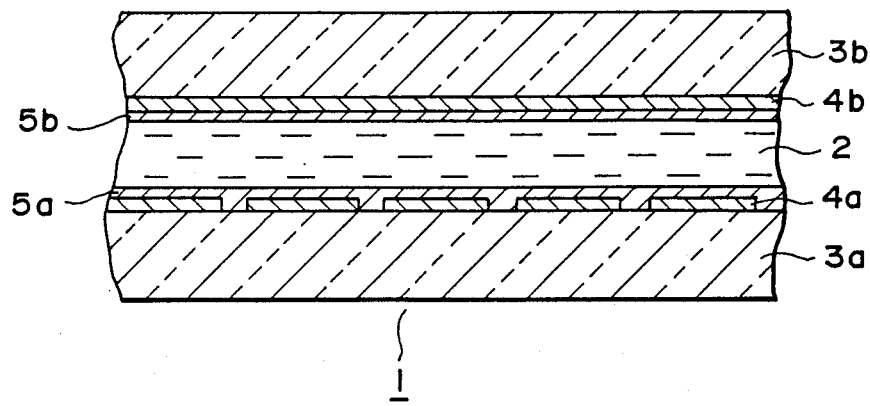
F I G. 3

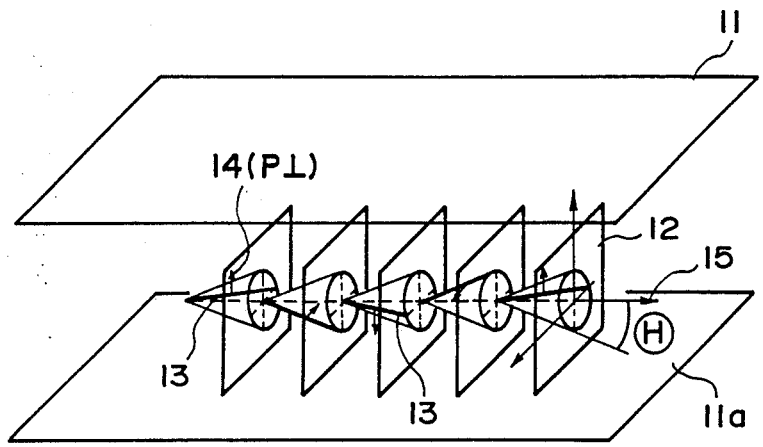
F I G. 4
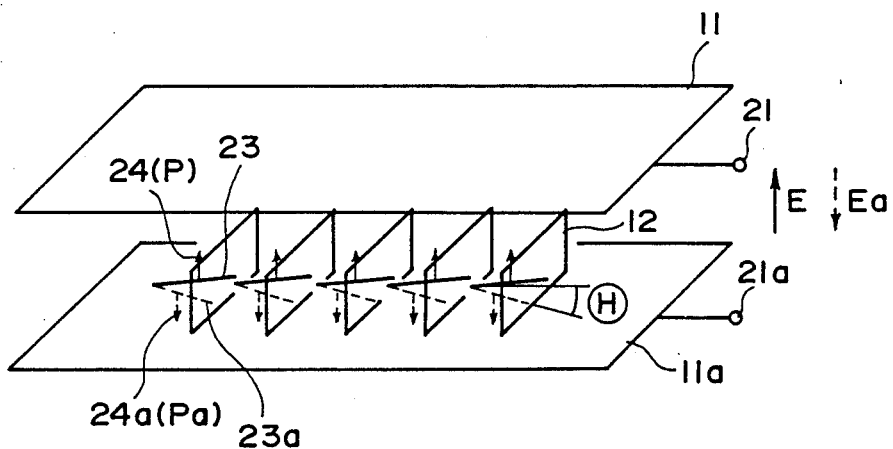
F I G. 5

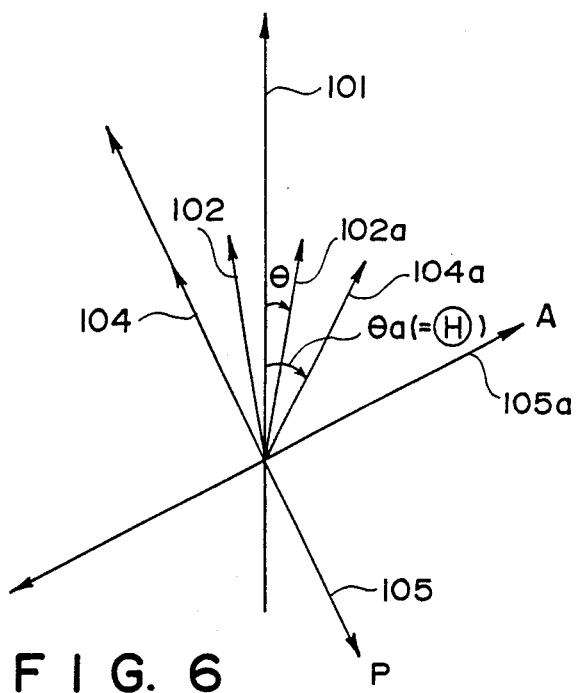
F I G. 6
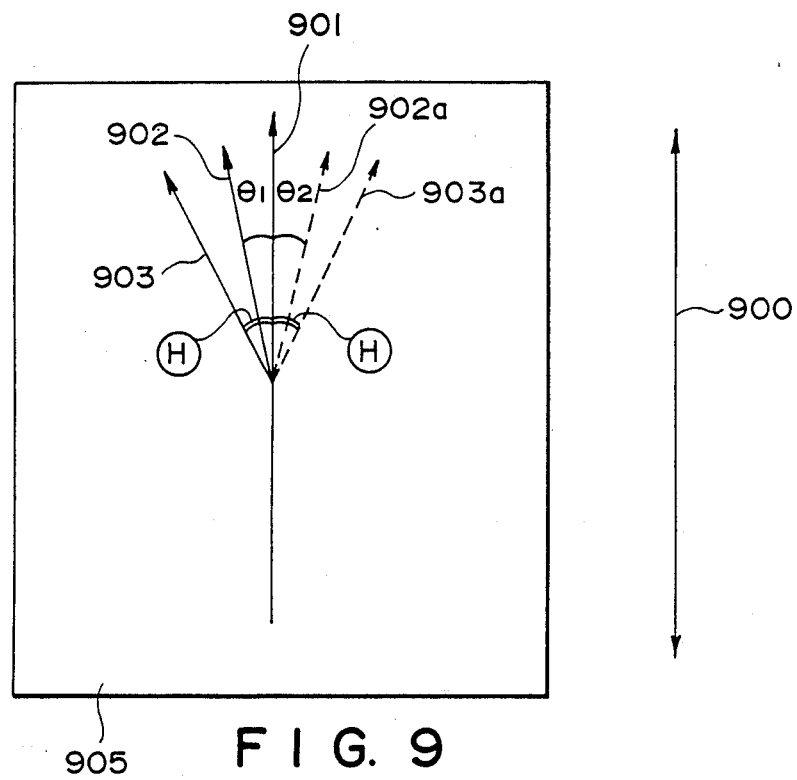
F I G. 9

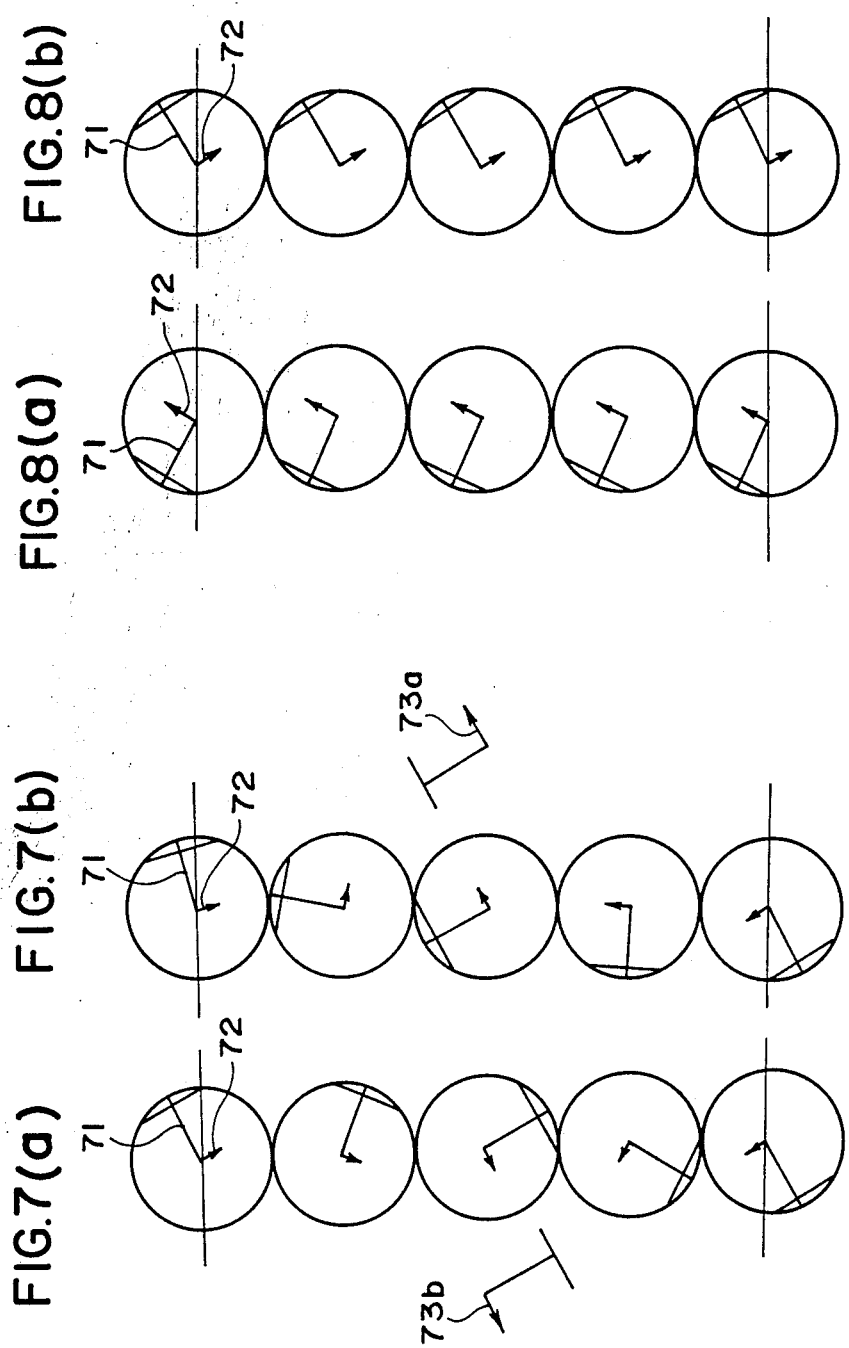

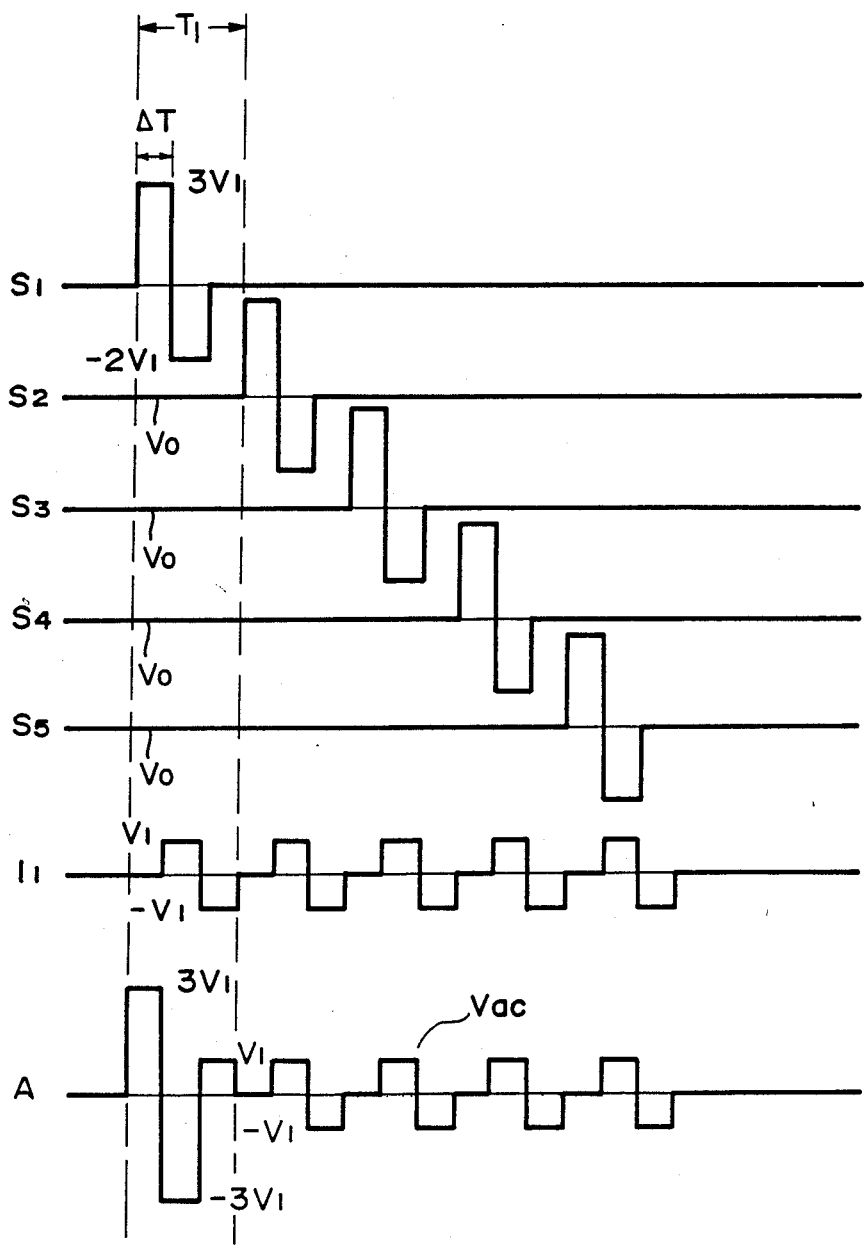
F I G. 10

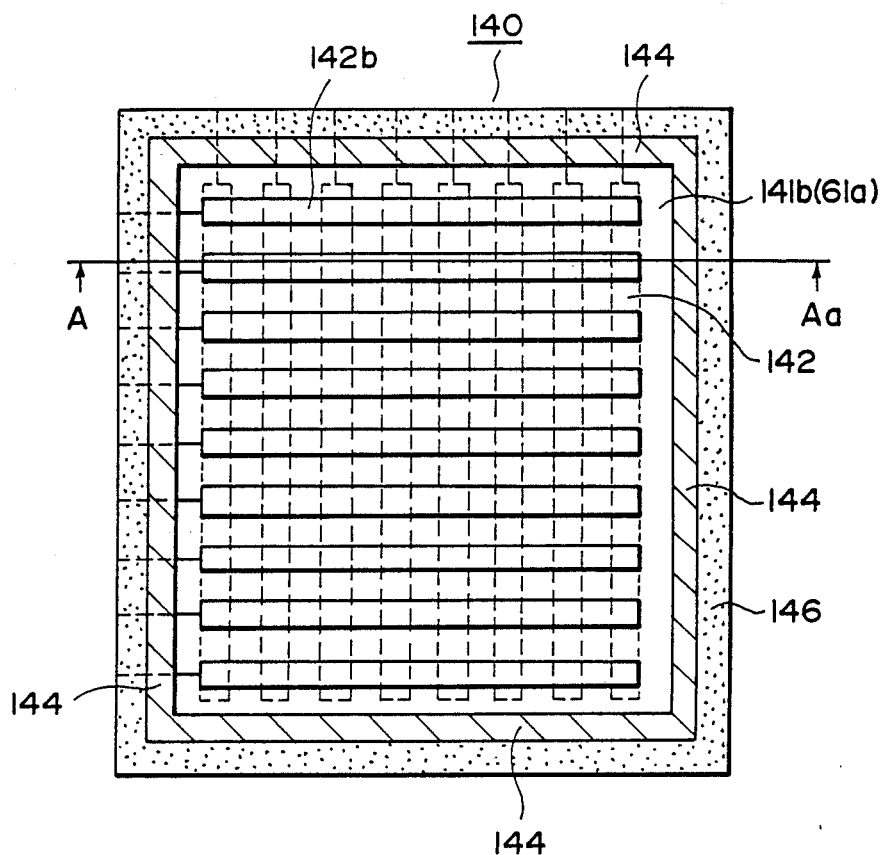
F I G. 14A
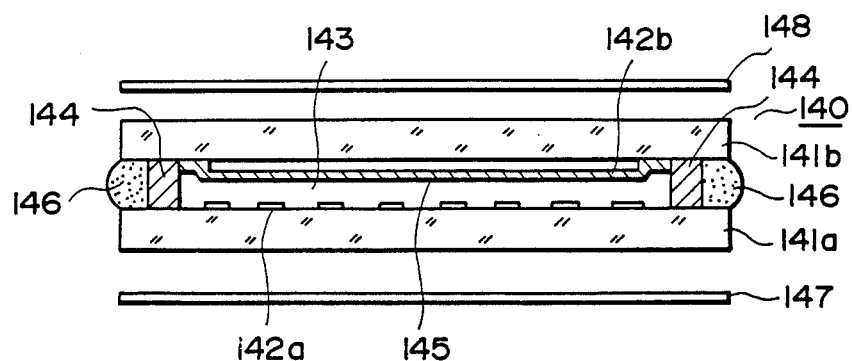
F I G. 14B

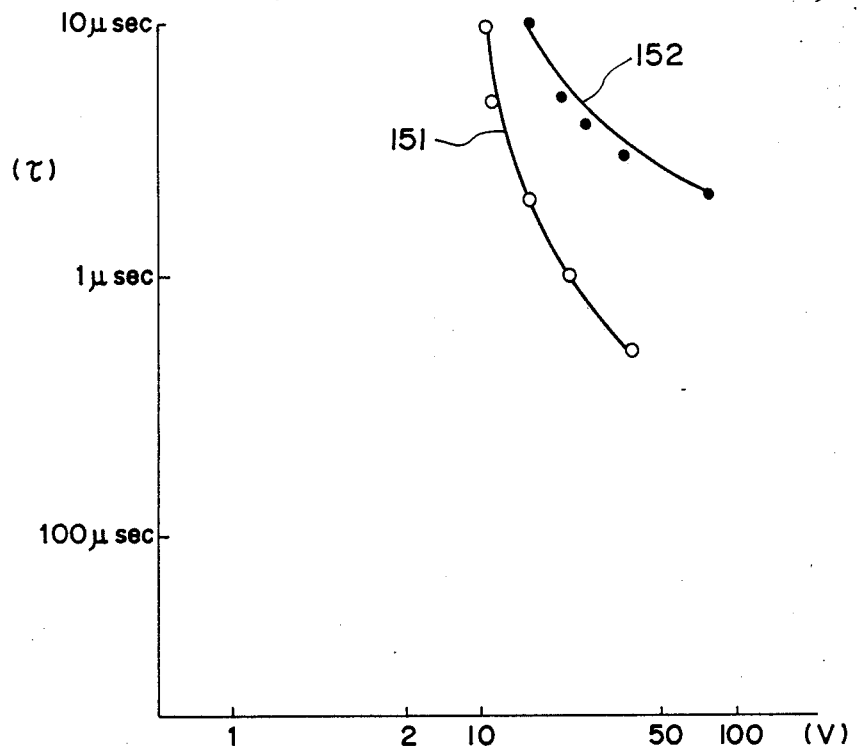
FIG. 15
FIG. 16(a)
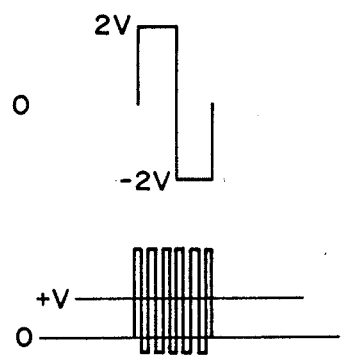
FIG. 16(b)
FIG. 16(c)
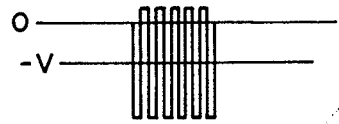
FIG. 16(d)

FIG. 17(b) 0 ———

FERROELECTRIC LIQUID CRYSTAL DEVICE AND DRIVING METHOD THEREFOR

CROSS-REFERENCE TO RELATED APPLICATIONS

This application is a continuation-in-part of U.S. patent application Ser. No. 854,583, filed Apr. 22, 1986, and U.S. patent application Ser. No. 170,109, filed Mar. 11, 1988, which in turn is a continuation of U.S. patent application Ser. No. 028,130, filed Mar. 19, 10 1987, all now abandoned.

FIELD OF THE INVENTION AND RELATED ART

The present invention relates to a ferroelectric liquid crystal device, and more particularly to a ferroelectric liquid crystal device capable of providing a display with a high contrast and a high display quality, and a driving method therefor.

Clark and Lagerwall have proposed the use of a liquid crystal device having bistability (Japanese Laid-Open Patent Application No. 107216/1981, U.S. Pat. No. 4,367,924, etc.). As the bistable liquid crystal, a ferroelectric liquid crystal having chiral smectic C (SmC*) phase or H (SmH*) phase is generally used. The ferroelectric liquid crystal has bistability, i.e., has two stable states comprising a first stable state and a second stable state, with respect to an electric field applied thereto. Accordingly, different from the conventional TN-type liquid crystal in the above-mentioned device, the liquid crystal is oriented to the first stable state in response to one electric field vector and to the second stable state in response to the other electric field vector. Further, this type of liquid crystal very quickly assumes either one of the above-mentioned two stable states in reply to an electric field applied thereto and retains the state in the absence of an electric field. By utilizing these properties, essential improvements can be attached with respect to difficulties involved in the conventional TN-type liquid crystal device.

In order to provide a uniform orientation or alignment characteristic to a ferroelectric liquid crystal in the above described type of device, there has been known to apply a uniaxial orientation treatment onto a substrate surface. More specifically, the uniaxial orientation treatment includes a method of rubbing a substrate surface with velvet, cloth or paper in one direction, or a method of obliquely depositing SiO or $SiO_2$ on a substrate surface.

By applying an appropriate uniaxial orientation treatment to a substrate surface, a specific bistable condition has been provided as an initial alignment characteristic. Under such an initial alignment condition, however, there have been observed practical problems such as poor contrasts and low light-transmittances during an optical modulation test carried out by using polarizers arranged in cross nicols in combination with the device.

More specifically, in a ferroelectric liquid crystal device of the type described above, a state wherein molecules of a liquid crystal (hereinafter sometimes abbreviated as "LC") are twisted from an upper substrate to a lower substrate in an LC molecular layer (twist alignment state) as shown in FIG. 7 is readily developed rather than a state wherein LC molecules are aligned in parallel with each other in an LC molecular layer (parallel alignment state) as shown in FIG. 8. Such a twist alignment of LC molecules leads to various disadvantages for a display device such that the angle forxed between the LC molecular axes in the first orientation state and the second orientation state (tilt angle) is apparently decreased to result in a decrease in contrast or light transmittance, and an overshooting occurs in the response of the LC molecules at the time of switching between the orientation states to result in an observable fluctuation in light transmittance.

SUMMARY OF THE INVENTION

The present invention has been accomplished to solve the above mentioned problems and particularly aims at providing a liquid crystal device with an improved luminance contrast.

Another object of the present invention is to provide a ferroelectric liquid crystal device adapted to a negative-positive reversal display.

A further object of the present invention is to provide a driving rethod wherein a ferroelectric liquid crystal can be driven in a parallel alignment state.

According to a first aspect of the present invention, there is provided a ferroelectric liquid crystal device, comprising: a pair of substrates each having a plurality of electrodes oppositely spaced from each other and intersecting with each other, and a ferroelectric liquid crystal layer disposed between the substrates and having a thickness small enough to release a helical structure in the absence of an electric field, a pixel being formed at each intersection of the opposite electrodes disposed on the pair of substrates while leaving non-pixel portions at which the opposite electrodes do not face each other; wherein the ferroelectric liquid crystal yields two stable orientation states providing two average molecular axes forming an angle $2\theta$ therebetween under no electric field; the ferroelectric liquid crystal yields two states providing two average molecular axes forming an angle 2 Ⓗ therebetween; the ferroelectric liquid crystal at the non-pixel portions forms an orientation state providing an average molecular axis forming an angle $\theta$ or $-\theta$.

According to a second aspect of the present invention, there is provided a driving method for a ferroelectric liquid crystal device of the type comprising matrix electrodes which include scanning lines and data lines forming a pixel at each intersection therebetween, and a ferroelectric liquid crystal disposed in a layer between the scanning lines and the data lines having a thickness small enough to release its own helical structure; wherein the ferroelectric liquid crystal has a switching threshold voltage Vth for causing a switching from one orientation state to another orientation state; the ferroelectric liquid crystal yields two stable orientation states providing two average molecular axes forming an angle $2\theta$ therebetween under no electric field; and the ferroelectric liquid crystal has an AC threshold voltage $(\tilde{V}ac)th$ for causing a conversion from the two stable orientation states providing the average molecular axes forming the angle $2\theta$ into two stable orientation states providing two average molecular axes forming an angle $2\theta_a$ which is larger than the angle $2\theta$; the driving method comprising applying an AC voltage with an rms value Vac satisfying the relation of:

$$(\tilde{V}ac)th \leq Vac < Vth.$$

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1, 6 and 9 are respectively a schematic plan view for illustrating an LC cell according to the present invention;

FIGS. 2 and 3 are a plan view and a sectional view, respectively, of an LC cell;

FIGS. 4 and 5 are respectively a schematic view for illustrating a ferroelectric liquid crystal cell;

FIGS. 7 and 8 are schematic views of projection of C directors on a chiral smectic molecular layer in a twist alignment state and in a parallel alignment state, respectively;

FIG. 10 is a time chart of driving waveforms used in a driving method according to the present invention;

FIG. 14A is a plan view of an FLC device used in the present invention; FIG. 14B is an A-Aa sectional view;

FIG. 15 shows pulse duration dependence upon a cell thickness;

FIG. 16 shows voltage signals used in FIG. 15; and

DETAILED DESCRIPTION OF PREFERRED EMBODIMENTS

Figure 11:
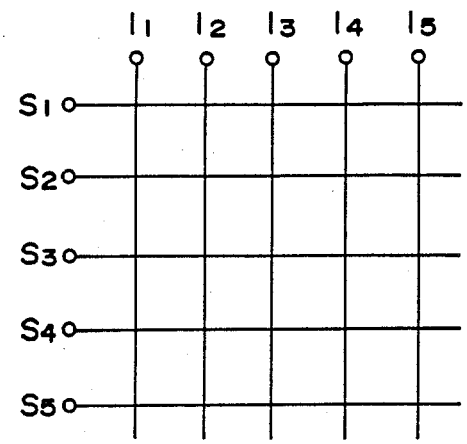
FIG. 11 is a schematic view of matrix electrodes used in the present invention.

In a preferred embodiment according to the present invention, there is provided a bistable FLC device comprising a pair of substrates having scanning electrodes and signal electrodes respectively disposed thereon so as to form matrix electrodes, and an FLC layer disposed therebetween having an alignment state (referred to as "initial alignment state") including a first stable state and a second stable state in a smectic phase, particularly a chiral smectic phase, produced from another higher-temperature phase on temperature decrease; in which when (a) the average molecular axis directions in one and the other, respectively, of the bistable states form an angle $2\theta$, (b) two average molecular axis directions formed by applying desired DC electric fields of two polarities between the electrodes form an angle 2 Ⓗ , and (c) two average molecular axis directions in the bistable states resultant after application of an AC voltage for several seconds to about 10 minutes to form an angle $2\theta a$, the angle $\theta$, $\theta a$ and Ⓗ satisfy the relationships of $\theta < \theta a \leq$ Ⓗ . In this instance, the AC voltage applied between the electrodes may preferably have a frequency of 20 Hz to 10 kHz and a voltage of 3 V to 100 V.

Liquid crystal materials most suited for the present invention are chiral smectic liquid crystals showing ferroelectricity. More specifically, liquid crystals showing chiral smectic C phase (SmC*), G phase (SmG*), F phase (SmF*), I phase (SmI*) or H phase (SmH*) are available.

Details of ferroelectric liquid crystals are described in, e.g., "LE JOURNAL DE PHYSIQUE LETTERS" 36 (L-69) 1975, "Ferroelectric Liquid Crystals"; "Applied Physics Letters" 36 (11) 1980, "Submicro Second Bistable Electrooptic Switching in Liquid Crystals": "Kotai Butsuri (Solid State Physics)" 16 (141) 1981, "Liquid Crystals", etc. In the present invention, ferroelectric liquid crystals disclosed in these publications may be used.

Examples of ferroelectric liquid crystal compounds include decyloxybenzylidene-p'-amino-2-methylbutylcinnamate (DOBAMBC), hexyloxybenzylidene-p'-amino-2-chloropropylcinnamate (HOBACPC), 4-o-(2-methyl)-butylresorcylidene-4'-octylaniline (MBRA 8), p-decyloxybenzylidene-p'-amino-2-methyl-α-cyanocinnamate (DOBAMBCC), p-tetradecyloxybenzylidene-p'-amino-2-methylbutyl-α-cyanocinnamate (TDOBAMBCC), p-octyloxybenzylidene-p'-amino-2-methylbutyl-α-chlorocinnamate (OOBAMBCC), p-octyloxybenzylidene-p'-amino-2-methylbutyl-α-methylcinnamate, 4-(2'-methylbutyl)phenyl-4'-octyloxybiphenyl-4-carboxylate, 4-hexyloxyphenyl-4-(2''-methylbutyl)-biphenyl-4'-carboxylate, 4-octyloxyphenyl-4-(2''-methylbutyl)-biphenyl-4'-carboxylate, 4-heptylphenyl-4-(4''-methylhexyl)biphenyl-4'-carboxylate, and 4-(2''-methylbutyl)-phenyl-4-(4''-methylhexyl)biphenyl-4'-carboxylate.

Especially preferred class of chiral smectic liquid crystals used in the liquid crystal device according to the present invention are those showing a cholesteric phase at a temperature higher than the temperature for giving a smectic phase. A specific example of such chiral smectic liquid crystal is a biphenyl ester type liquid crystal compound showing phase transition temperatures as shown in an example described hereinafter.

When a device is constituted by using these materials, the device may be supported with a block of copper, etc., in which a heater is embedded in order to realize a temperature condition where the liquid crystal compounds assume a desired phase.

Referring to FIG. 4, there is schematically shown an example of a ferroelectric liquid crystal cell for explanation of the operation thereof. An example where an SmC* phase constitutes a desired phase is explained. Reference numerals 11 and 11a denote base plates (glass plates) on which a transparent electrode of, e.g., $In_2O_3$, $SnO_2$, ITO (Indium-Tin-Oxide), etc., is disposed, respectively. A liquid crystal of an SmC*-phase in which liquid crystal molecular layers 12 are aligned perpendicular to surfaces of the glass plates is hermetically disposed therebetween. Full lines 13 show liquid crystal molecules. The liquid crystal molecules 13 continuously form a helical structure in the direction of extension of the base plates. The angle formed between the central axis 15 and the axis of a liquid crystal molecule 13 is expressed as Ⓗ . Each liquid crystal molecule 13 has a dipole moment (P⊥) 14 in a direction perpendicular to the axis thereof. When a voltage higher than a certain threshold level is applied between electrodes formed on the base plates 11 and 11a, a helical structure of the liquid crystal molecule 13 is unwound or released to change the alignment direction of respective liquid crystal molecules 13 so that the dipole moments (P⊥) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

The liquid crystal layer in the liquid crystal device of the present invention may be rendered sufficiently thin in thickness (e.g., less than 10 μ). As the thickness of the liquid crystal layer is decreased, the helical structure of the liquid crystal molecules is loosened even in the absence of an electric field whereby the dipole moment assumes either of two states, i.e., P in an upper direction 24 or Pa in a lower direction 24a as shown in FIG. 5. One half of the angle between the molecular axis 23 and the molecular axis 23a is referred to as a tilt angle ⒽⒷ, which is the same as half the apical angle of the cone of the helical structure. When an electric field E or Ea higher than a certain threshold level and different from each other in polarity as shown in FIG. 5 is applied to a cell having the above-mentioned characteristics, the dipole moment is directed either in the upper direction 24 or in the lower direction 24a depending on the vector of the electric field E or Ea. In correspondence with this, the liquid crystal molecules are oriented in either of a first stable state 23 and a second stable state 23a.

When the above-mentioned ferroelectric liquid crystal is used as an optical modulation element, it is possible to obtain two advantages as briefly touched on hereinbefore. First is that the response speed is quite fast. Second is that the orientation of the liquid crystal shows bistability. The second advantage will be further explained, e.g., with reference to FIG. 5. When the electric field E is applied to the liquid crystal molecules, they are oriented in the first stable state 23. This state is stably retained even if the electric field is removed. On the other hand, when the electric field Ea of which direction is opposite to that of the electric field E is applied thereto, the liquid crystal molecules are oriented to the second stable state 23a, whereby the directions of molecules are changed. This state is similarly stably retained even if the electric field is removed. Further, as long as the magnitude of the electric field E or Ea being applied is not above a certain threshold value, the liquid crystal molecules are placed in the respective orientation states.

Ferroelectric liquid crystal devices of the type as described above showing bistable or multi-stable orientation states have been disclosed in U.S. Pat. Nos. 4,367,924 and 4,563,059, issued to N. A. Clark et al.

Incidentally, there has been heretofore known a method of applying a uniaxial orientation treatment to substrate surfaces when a liquid crystal cell of a large area is produced. As methods of such uniaxial orientation treatment, there have been known a method of applying an alignment control film comprising a film of a polymer such as polyimide (RI) or polyvinyl alcohol (PVA) and rubbing the surface of thereof with velvet, cloth or paper, and a method of obliquely vapor-depositing SiO or $SiO_2$ on a substrate surface.

When a ferroelectric liquid crystal is disposed between substrate faces which have been provided with such an orientation treatment, a bistable initial alignment state with a tilt angle $\theta$ as will be described hereinafter is realized. However the bistable state is different from the ideal molecular arrangement explained with reference to FIG. 5 as will be described hereinafter.

FIG. 1 is a schematic view illustrating molecular orientation states in a liquid crystal device according to the present invention. FIG. 2 is a plan view of an example of a liquid crystal cell used in the present invention and FIG. 3 is a sectional view of the cell taken along the line X-Xa shown in FIG. 2.

Referring to FIGS. 2 and 3, an LC cell 1 comprises a pair of substrates 3a and 3b, of glass or a plastic, respectively provided thereon with stripe electrodes 4a and 4b of 1000 Å-thick ITO (Indium Tin Oxide) stripe electrode films and further thereon with PVA films 5a and 5b of about 500 Å in thickness. Between the alignment films are disposed negative-type resist spacers 6 of 20 μ-square dot shape so as to retain the liquid crystal layer 2 in a constant thickness over a wide area. The above mentioned two substrates, after having been subjected to a rubbing treatment, are secured to each other to form a cell into which the liquid crystal is then introduced.

Hereinbelow, an example wherein an ester type ferroelectric liquid crystal mixture (CS 1011, mfd. by Chisso K.K.) having a negative dielectric anisotropy was used is explained with reference to FIGS. 1 thourgh 3. The ester-type mixture liquid crystal showed the following phase transition temperatures as determined by microscopic observation: Iso.(isotropic phase) → Ch.(cholesteric phase) SmA (smectic A phase) 50° C. SmC* below 0° C. Cry.(crystal phase)

The preparation procedure of a ferroelectric liquid crystal cell 1 as shown in FIGS. 2 and 3 is supplemented hereinbelow.

First, a cell structure 1 containing the above mentioned biphenyl ester type liquid crystal is set in such a heating case (not shown) that the whole cell 1 is uniformly heated therein. When, the cell 1 is heated to a temperature (about 95° C.) where the liquid crystal in the cell assumes an isotropic phase. The temperature of the heating case is decreased whereby the liquid crystal in the cell 1 is subjected to a temperature decreasing stage. In the temperature decreasing stage, the liquid crystal in the isotropic phase is transformed at about 90° C. into cholesteric phase having a grandjean texture and, on further cooling, transformed from the cholesteric phase to SmA phase which is a uniaxially anisotropic phase at about 75° C. At this time, the axes of the liquid crystal molecules in the SmA phase are aligned in the rubbing direction.

Then, the liquid crystal in the SmA phase is transformed into an SmC* phase on further cooling, whereby a monodomain of SmC* phase with a non-spiral structure is formed if the cell thickness is of the order of, for example, 3 μm or less.

Referring again to FIG. 1, the figure is a schematic plan view illustrating the state of orientation of liquid crystal molecules as viewed from above the substrate face 105.

In the figure, the two-head arrow 100 indicates a direction of a uniaxial orientation treatment, i.e., the direction of rubbing in this embodiment. In the SmA phase, liquid crystal molecules are oriented or aligned in an average molecular axis direction 101 which coincides with the rubbing direction 100. In the SmC* phase, liquid crystal molecules are in a mixed state which averagely comprises oriented molecules having an average molecular axis 102 oriented to a direction inclined from the rubbing axis (central axis) 101 and oriented molecules having an average molecular axis 102a oriented to a direction reversely inclined from the rubbing axis (central axis) 101. The angle between average molecular axes 102 and 102a is denoted by $2\theta$. Further, with respect to the central axis dividing the angle $2\theta$ in two halves, the angle $-\theta$ denotes a counterclockwise angle and the angle $\theta$ denotes a clockwise angle. The rubbing axis and the central axis substantially coincide with each other in general, but can be deviated depending on the kind of the alignment film and rubbing conditions. In this particular example, the rubbing axis and the central axis coincided with each other and provided $|-\theta| = |\theta| = 6°$.

The threshold voltage of the above mentioned ferroelectric liquid crystal (FLC) device was about 5 V at a pulse duration of 1 msec. When a positive DC pulse exceeding the threshold voltage is applied to the FLC device, the LC molecules are oriented to assume an average molecular axis 103, and when a negative DC pulse exceeding the threshold voltage is applied, the LC molecules are reversely oriented to assume an average molecular axis 103a. The LC molecules in these states are not in the memory states but restored to assume the average molecular axis 102 and 102a, respectively, after the removal of the electric fields.

The angle between the average molecular axes 103 and 103a is denoted by 2 Ⓗ. With respect to the central axis dividing the angle 2 Ⓗ in two halves, the angle −Ⓗ forms a counterclockwise angle and the angle Ⓗ forms a clockwise angle.

Then, an AC electric field of 3-10 V and 20 Hz-10 KHz was applied to the cell for reversal minutes.

The average molecular axes after the AC application were respectively changed to directions forming angles of $-\theta a$ and $\theta a$ respectively from the rubbing axis (central axis) 101 and forming bistable states. In this example, the tilt angle $-\theta a$ and $\theta a$ substantially agreed with $-$ Ⓗ and Ⓗ, respectively, i.e., one half of the apex angle of a cone in the above mentioned helical structure, and were approximately $-18°$ and $18°$.

The above mentioned molecular axes after the AC application correspond to directions 104 and 104a in FIG. 1, and the LC molecules having the average molecular axes 104 and 104a are memorized in the respective states after the removal of the AC electric field.

Thus, due to the AC application, bistable states providing smaller tilt angles are converted to bistable states providing larger tilt angles. The mechanical for the "conversion" has not been clarified but may be presumed as follows.

In the bistable states obtained as initial alignment states, some "twist" of LC molecules may be present across the cell thickness as will be explained later with reference to FIG. 7, and due to the "twist", the average molecular axes may be optically observed to form smaller angles. On the other hand, the LC molecular arrangements after the AC electric field application may substantially agree with those under the ideal bistable states as shown in FIG. 5.

Switching between the bistable states after the AC application was effected by using a pulse voltage above a threshold similarly as that before the AC application, and the threshold was about 15 V at a pulse duration of 1 msec.

Incidentally, there is a problem in applying such a treatment to a cell having a matrix electrode structure to provide a display device, that is, the alignment states of LC molecules cannot be controlled at non-pixel portions where no electric field is applied. More specifically, at a non-pixel portion where oppositely spaced electrodes do not face each other, LC molecules cannot be controlled or oriented to one stable state. As a result, in an actual display device, FLC molecules at a non-pixel portion assume a mixed domain where molecules oriented to a first stable state 102 and molecules oriented to a second stable state 102a.

Now, a pair of polarizers are disposed so as to sandwich the cell in a cross nicol arrangement as shown in FIG. 6. At this time, one polarizer is so arranged that its polarization axis substantially coincides with an average molecular axis in either one stable state, e.g., an axis 104, at the pixel portions. In this example, a contrast of about 15 was obtained at the pixel portions in this example. On the other hand, at the non-pixel portions, there were portions of LC molecules oriented to the first stable state 102 and portions oriented to the second stable state 102a. As a result, the contrast of the display area including the non-pixel portions was about 13 in a region where the LC molecules at the non-pixel portions were oriented to the first stable state 102 and was about 10 in a region where the LC molecules at the non-pixel portions were oriented to the second stable state 102a. In other words, the difference in contrast depending on the difference in orientation state at the non-pixel portions could be suppressed to about 3, i.e., about 20% fluctuation with respect to the contrast at the pixel portions, which may be sufficiently tolerable for a display device. At this time, the pixel or aperture proportion (the ratio of the total pixel area to the whole display area) was 93.3%. Needless to say, the fluctuation in contrast can be further decreased by increasing the pixel proportion. In this embodiment of the present invention, a domain of orientation having the average molecular axis 102 and a domain of orientation having the average molecular axis) 102a are in mixture at the non-pixel portions.

In the present invention, it is further preferred to satisfy the conditions which will be explained hereinbelow in order to retain a good image quality for display. More specifically, it has been confirmed through a panel test that little irregularity is observed on a display picture when such conditions are satisfied. When the luminance (or quantity of transmitted light) of a domain oriented to have the average molecular axis 104 is denoted by $I_D$, the luminance of a domain oriented to have the average molecular axis 104a is denoted by $I_L$, and the luminances of domains oriented to have the average molecular axes 102 and 102a are denoted by $I_{H1}$ and $I_{H2}$, respectively, the luminances $I_{H1}$, $I_{H2}$, $I_D$ and $I_L$ may preferably satisfy the relationships of:

$I_{H2}/I_{H1} < 8$ and $I_D < I_{H1} < I_{H2} < I_L$; or $I_{H2}/I_{H1} < I_L/2I_D$ and $I_D < I_{H1} < I_{H2} < I_L$.

In general, when an image is displayed on a display device or panel comprising pixels, an easier-to-see display is provided in a case where the non-pixel portions have a color closer to the background. More specifically, it is preferred that the non-pixel portions have a color close to "dark" when the background is "dark" and a color close to "bright" when the background is "bright". Incidentally, a display panel is required to have a function of negative-positive reversal display in many cases. Accordingly, in order to effectively comply with both a case where the background is oriented to have the average molecular axis 104 and a case where the background is oriented to have the average molecular axis 104a, it is preferred that the ferroelectric liquid crystal at the non-pixel portions comprises in mixture a domain with an orientation providing the average molecular axis 102 and a domain with an orientation providing the average molecular axis 102a. More specifically, if the area of the domain with the orientation providing the average molecular axis 102 forming an angle of $-\theta$ is denoted by $S_a$ and the area of the domain with the orientation providing the average molecular axis 102a forming an angle of $\theta$ is denoted by $S_B$, an areal ratio $\alpha \ (=S_A/(S_A+S_B))$ may be set to satisfy the relation of $0.2 \leq \alpha \leq 0.8$, as a condition for providing little luminance irregularity on a display picture as a result of a panel test.

On the other hand, it is further preferred that a unit domain of orientation having the average molecular axis 102 forming angle $-\theta$ and a unit domain of orientation having the average molecular axis 102a forming angle $\theta$ are small enough in area so as to provide a half tone as a whole. In order to accomplish this, if the area of one domain having the averabe molecular axis 102 or 102a is denoted by A and the area of a minimum unit pixel is denoted by B, it is preferred that the relation of $A \leq B$ is satisfied.

The above mentioned tilt angles $\theta$, $\theta a$ and $\textcircled{H}$ may be measured by applying a positive pulse exceeding the threshold voltage, rotating the cross nicol polarizers to a position providing the darkest state of the device, then applying a negative pulse exceeding the threshold voltage, and then rotating the cross nicol polarizers to a position providing the darkest state of the device. At this time, the rotated angle between the two positions corresponds to twice the angle $\theta$, $\theta a$ or $\textcircled{H}$. The angles $\theta$ and $\theta a$ are tilt angles under memory conditions so that they are measured after removal of the pulse voltages, while the angle $\textcircled{H}$ is measured under application of the pulse voltages.

Some description is added to describe the microscopic internal structure of a chiral smectic ferroelectric liquid crystal layer. FIG. 7 is a schematic view of a section taken along a smectic molecular layer extending perpendicularly to the substrates of a liquid crystal cell wherein the helical structure has been released to establish a bistability condition in a twist alignment, and illustrates the arrangement of C directors (molecular axes) 71 and corresponding spontaneous polarizations 72. The uppermost circles which correspond to the projection of a liquid crystal cone on the smectic molecular layer represent the states in the neighborhood of the upper substrate, while the lowermost circles represent the states in the neighborhood of the lower substrate. Referring to FIG. 7, the state at (a) provides an average spontaneous polarization 73b directed downward, and the state at (b); provides an average spontaneous polarization 73a directed upward. As a result, by applying different directions of electric field to the liquid crystal layer, switching between the states (a) and (b) is caused.

FIG. 8 is a schematic sectional view corresponding to FIG. 7 of a liquid crystal cell which is in an ideal parallel alignment state where no twisting of C directors 71 across the thickness of the liquid crystal cell is involved. The spontaneous polarization 72 is upward in the state at (a) and downward in the state at (b).

As explained hereinabove, according to the present invention, an AC electric field is applied to a ferroelectric liquid crystal cell having a matrix electrode structure and showing bistability, thereby to realize a bistability condition with an enlarged tilt angle providing increased transmittance and contrast with providing uniform orientations at the non-pixel portions over the whole cell, whereby a ferroelectric liquid crystal device with excellent display characteristics may be provided.

In another preferred embodiment of the present invention, a ferroelectric liquid crystal at the nonpixel portions is brought to a monostable orientation state where the FLC molecules are oriented to have an average molecular axis forming either one of the angles $\theta$ and $-\theta$.

The ferroelectric liquid crystal under the nonstable condition used this embodiment is oriented to a single stable state in the absence of an electric field, but may be oriented to another quasi-stable state different from the single stable state when a DC pulse exceeding the threshold voltage is applied thereto and restored to the original stable state through relaxation after removal of the DC pulse. As a result, the angle between the average molecular axis directions in the stable state and in the quasi-stable state correspond to the angle $2\theta$ described hereinbefore.

The ferroelectric liquid crystal under the monostable condition used in the present invention may be brought to a bistable condition or multi-stable condition by applying an AC voltage as described above. This point will be explained in more detail hereinbelow.

FIG. 9 is a schematic view, similar to FIG. 1, illustrating molecular orientation states in a liquid crystal device according to this embodiment. The plan view and the sectional view of the liquid crystal device are the same as shown in FIGS. 2 and 3.

Referring to FIG. 9, the two-headed arrow 900 indicates a direction of a uniaxial orientation treatment, i.e., the direction of rubbing in this embodiment. In the SmA phase, LC molecules are aligned to have an average molecular axis direction 901 which coincides with the rubbing direction 900. In the SmC* phase, the LC molecules are brought to one monostable state wherein the LC molecules are oriented to have an average molecular axis 902 which is inclined at an angle $\theta_1$ from the rubbing direction 900.

When a prescribed DC pulse voltage exceeding the threshold is applied across the liquid crystal layer, the LC molecules are oriented to have a saturated average molecular axis 903a forming an angle $\textcircled{H}$ from the rubbing direction. After the DC pulse is removed, the LC molecules are re-oriented to have an average molecular axis 902a in a quasi-stable state forming an angle $\theta_2$ from the rubbing direction 900, but the LC molecules in the quasi-stable state are gradually restored to assume the average molecular axis in the monostable state.

The threshold voltage was about 5 V at a pulse duration of 1 msec in this embodiment. The angles $\theta_1$ and $\theta_2$ were about 9° and about 4°, respectively, while they vary depending on the kind of the alignment film and the rubbing conditions. Under a monostable condition, the relation of $\theta_1 \leq \theta_2$ may generally hold. Further, when a DC pulse voltage of a polarity opposite to the above DC pulse voltage is applied, the LC molecules are oriented to have a saturated average molecular axis 903 forming an angle $\textcircled{H}$ from the rubbing direction 900, which is restored to the stable average molecular axis when the pulse voltage is removed.

As described above, the LC molecules in the quasi-stable state are gradually stored to the original stable state, and the time required for the restoration ranges from several msec to several minutes while it can vary depending on the uniaxial orientation treatment. While the reason of occurrence of a monostable condition yielding one stable state and one quasi-stable state has not been precisely understood, it is considered that some unsymmetrical alignment control function provided to a pair of substrates has provided two states which by nature are bistable or equally stable but are actually not equivalent energetically.

As a result, at least in the initial alignment state, the LC molecules are oriented to the stable state at a lower energy providing the average molecular axis 902 over the entire cell.

Such a monostable condition may be realized by disposing spacers only on one side of substrate in the process of cell preparation, by providing different alignment films on a pair of substrates, or by using a combination of a substrate having a film of an organic polymer such as PI or PVA and a substrate provided with a film of a more inorganic substance such as a silane coupling agent. As another method of realizing such a monostable condition, different alignment control or orientation methods may be applied to a pair of substrates. Examples of such a different alignment control application method include a method of deviating the rubbing directions applied to a pair of substrates from the true parallelism or reverse-parallelism by a certain angle, a method of applying a rubbing treatment to only one substrate, a method of disposing alignment control films with different thicknesses on a pair of substrates, and a method of forming a laminar structure of ITO/insulating film/alignment film on one substrate and a laminar structure of ITO/alignment film on the other substrate.

In this way, a ferroelectric liquid crystal device under a monostable condition may be easily prepared by using a pair of substrates, which are unsymmetrical, for preparation of a cell.

An electric field of 3–10 V and 20–100 Hz was applied to a monostable cell having a structure as described above and using an ester-type ferroelectric liquid crystal mixture (CS-1011 (trade name) mfd. by Chisso K.K.). The LC molecules after the AC application were transformed to provide bistable states providing average molecular axis directions respectively forming an angle $\theta a$ from the rubbing direction 901. The tilt angle $\theta a$ substantially agreed with a half of the apex angle of a cone in the helical structure, and was approximately 18° in this particular example.

The mechanism for the conversion due to the AC application may be similar to one as explained above. The LC molecular arrangements after the AC application may substantially agree with those under the ideal bistable states as shown in FIG. 5 and may not be substantially affected by the unsymmetry of the alignment control function of the substrate surfaces.

Switching between the bistable states after the AC application was effected by using a pulse voltage above a threshold of about 15 V at a pulse duration of 1 msec. As different from the monostable condition before the AC application, the bistable states were retained even after removal of the electric field.

It is to be noted that the above mentioned conversion into a bistable condition is caused only at the pixel portions where the AC electric field is applied and the LC molecules at the non-pixel portions retain a monostable condition before the AC application As explained hereinabove, according to the present invention, an AC electric field is applied to a ferroelectric liquid crystal cell having a matrix electrode structure and showing a monostable characteristic, thereby to realize a bistability condition with an enlarged tilt angle providing increased transmittance and contrast while providing a uniform orientation at the non-pixel portions over the whole cell, whereby a ferroelectric liquid crystal device with excellent display characteristics may be provided.

As another problem, in a ferroelectric liquid crystal under a bistable or multi-stable condition with a small tilt angle $\theta$, the average molecular axis provides a maximum tilt angle $\widehat{\theta}$ at the time of switching but is returned to provide a small tilt angle $\theta$ in a memory state after the switching. Accordingly, the ferroelectric liquid crystal provides a maximum transmittance at the time of switching, but the transmittance is gradually lowered in the memory state. As a result, when a ferroelectric liquid crystal device using a ferroelectric liquid crystal in a twist or splay alignment state is applied to a line-sequential writing scheme, the display becomes brighter instantaneously at the time of writing or scanning, and this causes flickering on a displayed picture. Further, the low transmittance in the memory state provides a dark display.

In a preferred embodiment according to the present invention, these problems may be solved by a liquid crystal apparatus comprising: (a) a liquid crystal cell comprising a pair of substrates, and a ferroelectric liquid crystal disposed between the substrates and assuming either one stable orientation state of a bistable or multi-stable orientation states including at least a first stable state and a second stable state in the absence of an electric field; (b) means for applying an AC electric field so that the ferroelectric liquid crystal oriented to the first stable state is oriented to a third stable state and the ferroelectric liquid crystal oriented to the second stable state is oriented a fourth stable state; (c) matrix electrode means; (d) means for applying to the matrix electrode means a scanning selection signal and applying an information signal having a voltage peak-value exceeding the r.m.s. value of AC electric field in phase with the scanning selection signal; and (e) means for detecting an optical difference between light transmitted through the ferroelectric liquid crystal oriented to the third stable state and light transmitted through the ferroelectric liquid crystal oriented to the fourth stable state.

We have discovered that a ferroelectric liquid crystal in a twist or splay alignment state as described above can be reformed into a parallel alignment state as shown in FIG. 8. Particularly, in a preferred embodiment of the present invention, when a line-sequential writing scheme is applied to a liquid crystal apparatus having matrix electrodes composed of scanning lines and data lines, an AC voltage Vac satisfying the following relationship is applied to pixels on a non-selected scanning line among the matrix electrodes:

$$(\bar{V}ac)th \leq Vac \leq Vth,$$

wherein Vth denotes a switching threshold at the time of driving, i.e., a voltage required for switching the ferroelectric liquid crystal from the first stable state to the second stable state or from the second stable state to the first stable state; and $(\bar{V}ac)th$ denotes the rms value of an AC voltage required for converting the ferroelectric liquid crystal from the bistable or multi-stable state under the splay alignment as shown in FIG. 7 to the bistable or multi-stable state under the parallel alignment (hereinafter referred to as "threshold for parallel conversion").

As a result of our investigation on the relationship between the applied AC electric field and the change in alignment, the AC electric field for the above mentioned "conversion" (i.e., conversion from the bistability or multi-stability under the splay alignment to the bistability or multi-stability under the parallel alignment) does not substantially depend on the frequency but depends on the rms value of the AC electric field as far as the frequency is in the range of several Hz to several KHz, so that the "conversion" may be caused by applying an rms voltage Vac above the threshold for parallel conversion.

In this embodiment, the "conversion" was caused by applying a rectangular AC electric field of a frequency of 1 KHz, peak values of ±3 V and a duty of ½ (accordingly, the rms value was 3 V) for about 1 minute, and no conversion was caused by a voltage below the above value, so that the above mentioned threshold for conversion (Ṽac)th was judged to be about 3 V. The conversion was of course caused by applying a voltage thereabove.

Further, even if the parallel alignment was realized, when the ferroelectric liquid crystal was once heated into isotropic phase and then gradually cooled into SmC* phase (i.e., through Ch phase→SmA phase→SmC* phase in the case of the above mentioned ester type mixture liquid crystal "CS-1011"), the liquid crystal was restored to the splay alignment state. Accordingly, it cannot but be conducted that the parallel alignment state may energetically assume a minimum but not the smallest, and is at a higher energy level than the splay alignment. As a result, the parallel alignment state is not a bistable state which can be retained permanently but is a state which is sooner or later converted into a splay alignment state. The time required for restoration from the parallel alignment to the splray alignment was several hours to several weeks.

As for the switching threshold between bistable orientations under the respective bistability conditions or states, the switching threshold between bistable orientations before the conversion, i.e., in the splay, alignment state, was about 3 V at a pulse duration of 1 msec. On the other hand, the switching threshold between bistable orientations in the parallel alignment state is a little higher than that in the splay alignment state and was about 10 V at 1 msec in this embodiment.

As a result, in a preferred embodiment according to the present invention, the threshold for parallel conversion may be smaller than the switching threshold Vth between bistable orientations and particularly preferably set to be a value which is one third or less of a writing pulse voltage (3V in an embodiment shown in FIG. 10).

$$\tilde{V} = \left[ 1/T \cdot \int_0^T V^2(t) dt \right]^{\frac{1}{2}},$$

wherein V(t) denotes a voltage at time t, and T denotes a cycle period.

Figure 13:
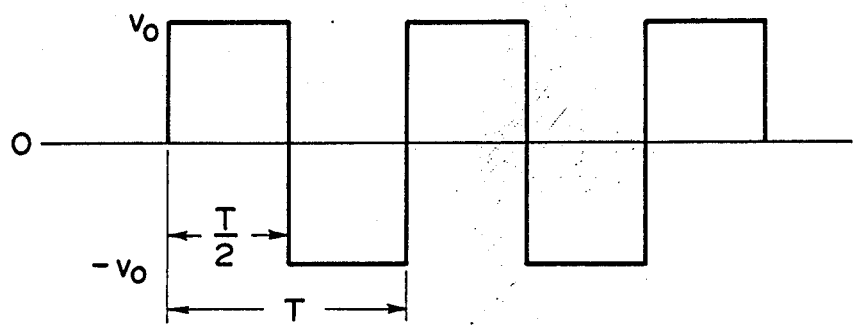
FIG. 13 is a waveform diagram of an AC voltage Vac used in the method of the present invention.

In a preferred embodiment of the present invention, a ½-duty rectangular waveform as shown in FIG. 13 may be used as the AC voltage Vac. The rms value $\tilde{V}$ is:

$$\tilde{V} = [1/T \cdot (v_0^2 \cdot T/2 + v_0^2 \cdot T/2)]^{\frac{1}{2}} = v_0$$

Figure 12:
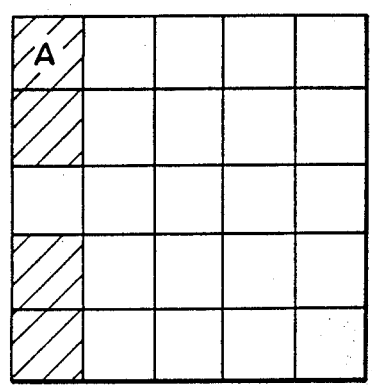
FIG. 12 is an illustration a display example of pixels written by the method of the present invention.

FIG. 11 is a diagram illustrating a matrix comprising scanning electrodes (scanning lines) and display electrodes (data lines), and FIG. 12 illustrates a display example of pixels formed at respective intersections in FIG. 11. Incidentally, FIG. 11 shows matrix electrodes for actual multiplexing driving, wherein $S_1$–$S_5$ denote scanning lines and $I_1$–$I_5$ denote data lines. In FIG. 12, the hatched portions represent pixels writte in "black" and the whitten portions represent pixels written in "white".

FIG. 10 shows a time chart for writing in the pixels shown in FIG. 12 by using the matrix electrodes shown in FIG. 11, i.e., by line-sequentially scanning the scanning signal lines $S_1$–$S_5$ and writing "black" in all the pixels on the data line $I_1$. In FIG. 10, ΔT denotes a writing pulse duration. In the writing, it is assumed that a positive electric field is used for writing "white" and a negative electric field is used for writing "black". Further, writing pulses have peak values of ±3 V, and a duration of ΔT. The voltage waveform shown at A in FIG. 10 is used for writing in the pixel A shown in FIG. 12.

In this embodiment, the pixels shown in FIG. 12 are driven by a scheme wherein pixels on a scanning line are once cleared and then a black-writing signal is applied to a selected data line connected to a selected pixel on the scanning line (line clear - line writing scheme). In this case, if the voltage peak-value of the "black"-writing signal applied to the data line is set to a voltage V satisfying the relation of (Ṽac)th≦V≦Vth, an AC voltage Vac having a peak-value V is applied to the pixels on the data line and the non-selected scanning lines.

As a result, in the driving method according to the present invention, the pixels on a picture under writing except for those on a writing line are always supplied with an AC voltage having an rms value exceeding the threshold for parallel conversion and smaller than the switching threshold, so that the ferroelectric liquid crystal is transformed into the parallel alignment state simultaneously with the commencement of the writing. As a result, no flickering on the picture is caused during writing and a "white" display state having a high transmittance is realized.

Figure 17A:
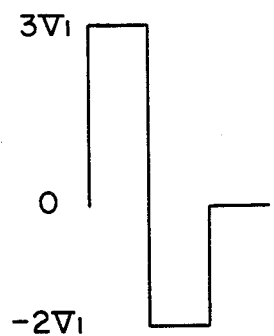
Figure 17C:
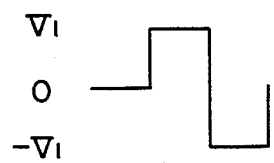
Figure 17D:
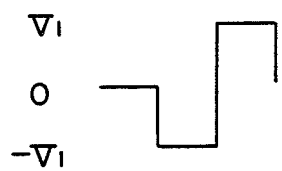

Further, in the present invention, a "black" signal applied to data lines in phase with a scanning selection signal may be an alternating waveform signal of +V and −V as shown in FIG. 10, and a "white" signal may be an alternating waveform signal of −V and +V of a reverse succession. In conformity with FIG. 10, FIG. 17(a) represents a scanning selection signal applied to a selected scanning line; FIG. 179b) shows a scanning non-selection signal applied to a non-selected scanning line; and FIGS. 17(c) and 17(d) respectively show "black" and "white" data signals.

In addition to "CS-1011" (trade name; a ferroelectric liquid crystal having a negative dielectric anisotropy, mfd. by Chisso K.K.), used in the embodiment of FIG. 10, the following liquid crystal composition A may also be used as a ferroelectric liquid crystal material having a dielectric anisotropy:

Liquid Crystal Composition A

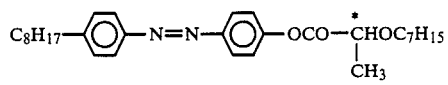

(10 wt. parts)

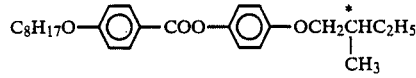

(10 wt. parts)

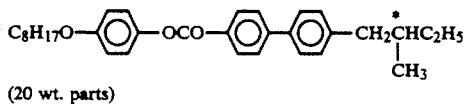

(20 wt. parts)

This liquid crystal material shows the following phase transition in the course of temperature decrease:

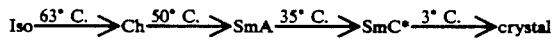

When this liquid crystal material is formed in a layer having a sufficiently large thickness, it assumes a spiral structure with a pitch of about 5μ.

The liquid crystal material (liquid crystal composition A) used in this embodiment, if formed in a liquid crystal cell layer thickness of about 4μ, provides the first and second stable orientation states when no electric field is applied thereto. FIG. 15 shows comparison of switching characteristics between a case where such a cell state is transformed into a bistability state comprising the third and fourth stable states by the application, and a case where a cell having a large thickness (about 15μ) is transformed into a bistability state comprising the third and fourth stable states.

A curve 152 in FIG. 15 shows the results of an experiment wherein a liquid crystal cell having a cell thickness of 15μ showing a ferroelectric liquid crystal of a spiral structure and not substantially showing the first and second stable orientation states in FIG. 9 was subjected to application of a voltage signal as shown in FIG. 16 obtained by superposing a high frequency rectangular alternating voltage of 10 KHz and ±40 volts (Vpp) to form third and fourth stable orientation states, and voltage values (V) and applied pulse durations (τ) required for causing the switching between the third and fourth stable orientation states. On the other hand, a curve 151 shows the results of an experiment wherein a liquid crystal cell having a cell thickness of 4μ and providing a nonspiral structure including the first and second stable orientation states shown in FIG. 9 was subjected to application of a voltage signal in the same manner as explained above except that a high frequence alternating voltage of 10 KHz and ±20 volts (Vpp) was used. Accordingly, in FIG. 15, the abscissa represents the voltage value (V, threshold) of driving pulses required for switching, and the ordinate represents the applied pulse durations (τ). In FIG. 15, symbols O denote the measured values obtained by using the 4 μ-thick liquid crystal cell, and by the 15 μ-thick cell. The results of FIG. 15 show the following points.

(1) The 4 μ-thick cell provided a steeper slope. This means that the 4 μ-thick cell is more advantageous for effecting a time-division driving while preventing a crosstalk phenomenon.

(2) The 4 μ-thick cell could be driven by a lower driving voltage. This means that the 4 μ-thick cell allows the use of low withstand voltage IC drivers.

The above-mentioned points are also applicable to the embodiment of FIG. 10.

According to the present invention, simultaneously with the start of writing, a ferroelectric liquid crystal in the splay alignment state may be converted into the parallel alignment, whereby flickering on a picture at the time of writing is prevented and a clear "white" display state with a high transmittance. Thus, a display quality can be remarkably improved.

FIGS. 14A and 14B illustrate an embodiment of the liquid crystal device according to the present invention. FIG. 14A is a plan view of the embodiment and FIG. 14B is a sectional view taken along the line A-Aa in FIG. 14A.

A cell structure 140 shown in FIG. 14 comprises a pair of substrates 141a and 141b made of glass plates or plastic plates which are held with a predetermined gap with spacers 144 and sealed with an adhesive 146 to form a cell structure. On the substrate 141a is further formed an electrode group (e.g., an electrode group for applying scanning voltages of a matrix electrode structure) comprising a plurality of transparent electrodes 142a in a predetermined pattern, e.g., of a stripe pattern. On the substrate 141b is formed another electrode group (e.g., an electrode group for applying signal voltages of the matrix electrode structure) comprising a plurality of transparent electrodes 142b intersecting with the transparent electrodes 142a.

On the substrate 141b provided with such transparent electrodes 142b may be further formed an alignment control film 145 composed of an inorganic insulating material such as silicon monoxide, silicon dioxide, aluminum oxide, zirconia, magnesium fluoride, cerium oxide, cerium fluoride, silicon nitride, silicon carbide, and boron nitride, or an organic insulating material such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin and acylic resin.

The alignment control film 145 may be formed by first forming a film of an inorganic insulating material or an organic insulating material as described above and then rubbing the surface thereof in one direction with velvet, cloth, paper, etc.

In another preferred embodiment according to the present invention, the alignment control film 145 may be formed as a film of an inorganic insulating material such as SiO or SiO$_2$ on the substrate 101b by the oblique or tilt vapor deposition.

It is preferred that the alignment control film 145b also functions as an insulating film. For this purpose, the alignment control film may preferably have a thickness in the range of 100 Å to 1 μ, especially 500 to 5000 Å. The insulating film also has a function of preventing the occurrence of an electric current which is generally caused due to minor quantities of impurities contained in the liquid crystal layer 143, whereby deterioration of the liquid crystal compound is prevented even on repeating operations.

In the liquid crystal device according to the present invention, another alignment control film similar to the film 145 cna be disposed on another substrte 141a.

The liquid crystal layer 143 in the cell structure 140 shown in FIG. 14 may be formed in SmC* and may have a thickness small enough to release a helical structure.

Such a cell structure 140 having substrates 141a and 141b is sandwiched between a pair of polarizers 147 and 148 to form an optical modulation device causing optical modulation when a voltage is applied between electrodes 142a and 142b.

What is claimed is:

1. A ferroelectric liquid crystal device, comprising:

a pair of substrates each having a plurality of electrodes oppositely spaced from each other, the electrodes on said pair of substrates being disposed so as to intersect with each other, and a ferroelectric liquid crystal layer disposed between the substrates having a thickness which is small enough to release a helical structure of the ferroelectric liquid crystal in the absence of an electric field, wherein a pixel is at each intersection of the opposite electrodes formed on the pair of substrates and non-pixel portions are where the opposite electrodes do not face each other, wherein the ferroelectric liquid crystal provides two average molecular axes forming an angle $2\theta$ therebetween under the application of no electric field;

the ferroelectric liquid crystal provides a first average molecular axis under application of a voltage of one polarity exceeding one threshold and a second average molecular axis under application of a voltage of the other polarity exceeding the other threshold, said first and second average molecular axes forming an angle $2\bar{\theta}$ therebetween satisfying $\bar{\theta} > \theta$; the ferroelectric liquid crystal at the nonpixel portions forming an orientation state providing an average molecular axis forming an angle $\theta$ or $-\theta$; the ferroelectric liquid crystal also providing a third average molecular axis after application of said voltage of one polarity exceeding the one threshold and then under or after application of an AC voltage which is insufficient to result in said second average molecular axis and a fourth average molecular axis after application of said voltage of the other polarity exceeding the other threshold and then under of after application of an AC voltage which is insufficient to result in said first average molecular axis, said third and fourth average molecular axes forming an angle $2\theta_a$ therebetween satisfying $\bar{\theta} \geq \theta_a > \theta$; and a pair of cross nicol polarizers disposed to sandwich the ferroelectric liquid crystal layer such that the polarizing axis of one of the polarizers substantially coincides with one of said third and fourth average molecular axes.

2. A device according to claim 1, wherein the ferroelectric liquid crystal at the non-pixel portions forms a mixed state including an orientation state providing an average molecular axis of the angle $\theta$ and an orientation state providing an average molecular axis of the angle $-\theta$.

3. A device according to claim 2, wherein the ferroelectric liquid crystal at the non-pixel portions comprises an area $S_A$ of a domain with the orientation state providing the average molecular axis of the angle $-\theta$ and an area $S_B$ of a domain with the orientation state providing the average molecular axis of the angle $\theta$, the areas $S_A$ and $S_B$ satisfying the relation of:

$$0.2 \leq S_A/(S_A + S_B) \leq 0.8.$$

4. A device according to claim 1, wherein the AC voltage has a frequency of 20 Hz-10 KHz, and a peak value of 3 V to 100 V.

5. A device according to claim 1, wherein said ferroelectric liquid crystal is a chiral smectic liquid crystal.

6. A device according to claim 5, wherein said chiral smectic liquid crystal is in a chiral smectic phase formed through temperature decrease from a higher temperature phase different therefrom.

7. A device according to claim 5, wherein said chiral smectic liquid crystal is in a chiral smectic phase formed through cholesteric phase on temperature decrease.

8. A device according to claim 5, wherein said chiral smectic liquid crystal is in a chiral smectic phase formed through cholesteric phase and smectic A phase on temperature decrease.

9. A device according to claim 5, wherein said chiral smectic liquid crystal is in chiral smectic C phase or H phase.

10. A device according to claim 1, wherein the ferroelectric liquid crystal provides luminances $I_{H1}$ and $I_{H2}$ for the average molecular axes of the angles $\theta$ and $-\theta$, respectively, and luminances $I_D$ and $I_L$ for the average molecular axes of the angles $\theta a$ and $-\theta a$; the luminances $I_{H1}$, $I_{H2}$, $I_D$ and $I_L$ satisfying the relationships of:

$$I_D < I_{H1} < I_{H2} < I_L, \text{ and}$$

$$I_{H2}/I_{H1} < 8.$$

11. A device according to claim 1, wherein the ferroelectric liquid crystal provides luminances $I_{H1}$ and $I_{H2}$ for the average molecular axes of the angles $\theta$ and $-\theta$, respectively, and luminances $I_D$ and $I_L$ for the average molecular axes of the angles $\theta a$ and $-\theta a$; the luminances $I_{H1}$, $I_{H2}$, $I_D$ and $I_L$ satisfying the relationships of:

$$I_D < I_{H1} < I_{H2} < I_L, \text{ and}$$

$$I_{H2}/I_{H1} < I_L/2I_D.$$

12. A device according to claim 1, wherein a unit domain of the ferroelectric liquid crystal with an orientation providing an average molecular axis of the angle $\theta$ or $-\theta$ has an area A satisfying the relation of $A \leq B$, wherein B denotes the area of the smallest unit pixel area.

13. A device according to claim 1, wherein at least one of said pair of substrates has an alignment control film contacting the ferroelectric liquid crystal.

14. A device according to claim 13, wherein said alignment control film is provided with a uniaxial orientation axis.

15. A device according to claim 14, wherein said unaxial orientation axis has been provided by rubbing.

16. A device according to claim 14, wherein said uniaxial orientation axis is provided by a film formed by oblique vapor deposition.

17. A device according to claim 13, wherein said alignment control film is formed of an inorganic insulating material or an organic insulating material.

18. A device according to claim 17, wherein said inorganic insulating material comprises at least one member selected from the group consisting of silicon monoxide, silicon dioxide, aluminum oxide, zirconia, magnesium fluoride, cerium oxide, cerium fluoride, silicon nitride, silicon carbide, and boron nitride.

19. A device according to claim 17, wherein said organic insulating material comprises at least one member selected from the group consisting of polyvinyl alcohol, polyimide, polyamide-imide, polyester-imide, polyparaxylylene, polyester, polycarbonate, polyvinyl acetal, polyvinyl chloride, polyamide, polystrene, cellulose resin, melamine resin, urea resin and acrylic resin.

20. A device according to claim 1, wherein the ferroelectric liquid crystal at the non-pixel portions forms a single orientation providing an average molecular axis of the angle $\theta$ or $-\theta$.

21. A driving method for a ferroelectric liquid crystal device of the type comprising matrix electrode which include scanning lines and data lines forming a pixel at each intersection therebetween, and a ferroelectric liquid crystal disposed in a layer between the scanning lines and the data lines having a thickness which is small enough to suppress the helical structure of the ferroelectric liquid crystal in the absence of an electric field; wherein the ferroelectric liquid crystal provides two average molecular axes forming an angle $2\theta$ therebetween under no electric field; a first average molecular axis under application of a voltage of one polarity exceeding one threshold and a second average molecular axis under application of a voltage of the other polarity exceeding the other threshold, said first and second average molecular axes forming an angle 2 ⊕ therebetween satisfying ⊕ $>\theta$; the driving method comprising the steps of:

applying to at least one scanning line a scanning selection signal comprising a pulse of one or the other polarity with respect to a voltage applied to a scanning line when not selected to select said at least one scanning line; and applying a first data signal and a second data signal selectively to the data lines so that each data line is supplied with either one of the first or second data signals based on given data in synchronism with the scanning selection signal applied to said at least one scanning line, said first and second data signals respectively comprising a bipolar pulse including unit pulses of one and the other polarities with respect to said voltage applied to a scanning line when not selected, said first and second data signals being opposite in polarity in at least one unit pulse phase, thereby supplying the data lines with an AC voltage;

whereby a pixel on said at least one selected scanning line is supplied with a combination of said pulse of one or the other polarity and at least one unit pulse of either one of said first and second data pulses whereby the molecules at the pixel are oriented to either one of the first and second orientation states providing the angle 2 ⊕ and a pixel on the non-selected scanning line is supplied with an AC voltage which is insufficient to result in said first or second average molecular axes, whereby the molecules at the pixel are oriented to either one of two orientation states providing two average molecular axes forming and angle $2\theta$ a therebetween, wherein ⊕ $\geq \theta a > \theta$.

22. A method according to claim 21, wherein said two average molecular axes forming the angle $2\theta a$ formed in the presence of a substrate provided with a uniaxial orientation treatment.

23. A method according to claim 22, wherein said uniaxial orientation treatment is a rubbing treatment.

24. A method according to claim 21, wherein said ferroelectric liquid crystal is a chiral smectic liquid crystal.

25. A method according to claim 24, wherein said chiral smectic liquid crystal is in a chiral smectic phase formed through cholesteric phase on temperature decrease.

26. A method according to claim 24, wherein said chiral smectic liquid crystal is in a chiral smectic phase formed through cholesteric phase and smectic A phase on temperature decrease.

27. A method according to claim 24, wherein said chiral smectic liquid crystal is in chiral smectic C phase or H phase.

28. A method according to claim 21, wherein said ferroelectric liquid crystal is oriented in the presence of an alignment control film.

29. A method according to claim 28, wherein said alignment control film is formed of an inorganic insulating material or an organic insulating material.

30. A method according to claim 29, wherein said inorganic insulating material comprises at least one member selected from the groups consisting of silicon monoxide, silicon dioxide, aluminum oxide, zirconia, magnesium fluoride, cerium oxide cerium fluoride, silocon nitride, silicon carbide, and boron nitride.

31. A method according to claim 29, wherein said organic insulating material comprises at least one member selected from the group consisting of polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin and acrylic resin.

32. A liquid crystal apparatus, comprising:
(a) a ferroelectric liquid crystal device comprising matrix electrodes which include scanning lines and data lines forming a pixel at each intersection therebetween, and a ferroelectric liquid crystal having a negative dielectric anisotropy disposed in a layer between the scanning lines and the data lines, said ferroelectric liquid crystal layer having a thickness which is small enough to suppress the helical structure of the ferroelectric liquid crystal in the absence of an electric field; the ferroelectric liquid crystal provides two average molecular axes forming an angle $2\theta$ therebetween under the application of no electric field; a first average molecular axis under the application of a voltage of one polarity exceeding one threshold and a second average molecular axis under the application of a voltage of the other polarity exceeding the other threshold, said first and second molecular axes forming an angle 2 ⊕ therebetween satisfying ⊕ $>\theta$;
(b) means for applying to at least one scanning line a scanning selection signal comprising a pulse of one or the other polarity with respect to a voltage applied to a scanning line when not selected to select said at least one scanning line; and
(c) means for selectively applying a first data signal and a second data signal to the data lines so that each data line is supplied with either one of the first and second data signals based on given data in synchronism with the scanning selection signal applied to said at least one scanning line, said first and second data signals respectively comprising a bipolar pulse including unit pulses of one and the other polarities with respect to said voltage applied to a scanning line when not selected said first and second data signals being opposite in polarity in at least one unit pulse phase, so that the data lines are supplied with an AC voltage; whereby
a pixel on said at least one selected scanning line is supplied with a combination of said pulse of one or the other polarity and at least one unit pulse of either one of said first and second data pulses whereby the molecules at the pixel are oriented to either one of the first and second orientation states providing the angle 2 Ⓗ ; and a pixel on the non-selected scanning line is supplied with an AC voltage which is insufficient to provide the first or second average molecular axes, whereby the molecules at the pixel are oriented to either one of two orientation states providing two average molecular axes forming an angle $2\theta a$ therebetween, wherein Ⓗ $\geq \theta > \theta$.

33. An apparatus according to claim 32, wherein said ferroelectric liquid crystal is a chiral smectic liquid crystal.

34. An apparatus according to claim 33, wherein said chiral smectic liquid crystal is in a chiral smectic phase formed through cholesteric phase on temperature decrease.

35. An apparatus according to claim 33, wherein said chiral smectic liquid crystal is in a chiral smectic phase formed through cholesteric phase and smectic A phase on temperature decrease.

36. An apparatus according to claim 33, wherein said chiral smectic liquid crystal is in chiral smectic C phase or H phase.

* * * * *

UNITED STATES PATENT AND TRADEMARK OFFICE
CERTIFICATE OF CORRECTION

PATENT NO. : 4,941,736

DATED : July 17, 1990

INVENTOR(S) : OSAMU TANIGUCHI, ET AL.

It is certified that error appears in the above-identified patent and that said Letters Patent is hereby corrected as shown below:

ON THE TITLE PAGE,

[30] FOREIGN APPLICATION PRIORITY DATA

"Apr. 24, 1985 [JP] Japan .... 64-087830" should read
--Apr. 24, 1985 [JP] Japan ....60-087830--.; and
"Apr. 24, 1985 [JP] Japan .... 64-087828" should read
--Apr. 24, 1985 [JP] Japan .... 60-087828--.

ON THE TITLE PAGE,

[57] ABSTRACT

Line 15, "angle 2 H" should read --angle 2 (H)--.

COLUMN 1

Line 11, "Mar. 19, 10 1987," should read
--Mar. 19, 1987,--.
Line 39, "attached" should read --attained--.

COLUMN 2

Line 2, "forxed" should read --formed--.
Line 19, "rethod" should read --method--.

COLUMN 3

Line 21, "illustration" should read --illustration of--.
Line 29, insert --Figures 17(a)-(d) illustrate waveforms in accordance with the present invention.--.
Line 51, "angle $\theta$, $\theta$a and (H)" should read
--angles $\theta$, $\theta$a and (H)--.

UNITED STATES PATENT AND TRADEMARK OFFICE
CERTIFICATE OF CORRECTION

PATENT NO. : 4,941,736
DATED : July 17, 1990
INVENTOR(S) : OSAMU TANIGUCHI, ET AL.

It is certified that error appears in the above-identified patent and that said Letters Patent is hereby corrected as shown below:

COLUMN 6

Line 6, "500 Åin" should read --500 Å in--.
Line 17, "thourgh" should read --through--.
Line 20, "Iso.(isotropic phase)→Ch.(cholest-" should read --Iso.(isotropic phase)$\xrightarrow{90°C}$Ch.(cholesteric phase)$\xrightarrow{75°C}$SmA(smectic A phase)$\xrightarrow{50°C}$SmC*$\xrightarrow{below\ 0°C}$Cry.(crystal phase)--.
Line 21 should be deleted.
Line 22 should be deleted.
Line 29, "When," should read --Then,--.

COLUMN 7

Line 24, "reversal" should read --several--.

COLUMN 8

Line 29, "axis) 102a" should read --axis 102a--.
Line 47, "<$I_L$," should read --<$I_L$.--.

COLUMN 9

Line 4, "areal ratio $\alpha$ (=S/$_A$/($S_A$+$S_B$))" should read --areal ratio $\alpha$ (=$S_A$/($S_A$+$S_B$))--.
Line 14, "averabe" should read --average--.
Line 47, "(b);" should read --(b)--.

COLUMN 10

Line 60, "stored" should read --restored--.

UNITED STATES PATENT AND TRADEMARK OFFICE
CERTIFICATE OF CORRECTION

PATENT NO. : 4,941,736

DATED : July 17, 1990

INVENTOR(S) : OSAMU TANIGUCHI, ET AL.

It is certified that error appears in the above-identified patent and that said Letters Patent is hereby corrected as shown below:

COLUMN 11

Line 34, "Iiq-" should read --liq---.
    Line 60, "AC application" should read --AC application.--.

COLUMN 13

Line 25, "but be conducted" should read --be helped--.
    Line 32, "splray" should read --splay--.
    Line 37, "splay," should read --splay--.
    Line 50, Insert --The rms value $\tilde{V}$ used herein is calculated by:--.

COLUMN 14

Line 3, "writte" should read --written--.
    Line 4, "whitten" should read --white--.
    Line 25, "($\tilde{V}ac$)th$\leq$V$\leq$Vth," should read --($\tilde{V}ac$)th$\leq$V<Vth,--.
    Line 48, "FIG. 179b)" should read --FIG. 17(b)--.

COLUMN 15

Line 46, "high frequence" should read --high frequency--.

COLUMN 16

Line 42, "substrate 101b" should read --substrate 142b--.
    Line 57, "cna" should read --can-- and "substrte 141a." should read --substrate 141a.--.

UNITED STATES PATENT AND TRADEMARK OFFICE
CERTIFICATE OF CORRECTION

PATENT NO. : 4,941,736
DATED : July 17, 1990
INVENTOR(S) : OSAMU TANIGUCHI, ET AL.

It is certified that error appears in the above-identified patent and that said Letters Patent is hereby corrected as shown below:

COLUMN 17

Line 20, "there-" should read --threshold,--.
Line 21, "shold," should be deleted.
Line 29, "thereshold" should read --threshold--.

COLUMN 18

Line 13, "$\theta$and" should read --$\theta$ and--.
Line 24, "$\theta$and" should read --$\theta$ and--.

COLUMN 19

Line 4, "of the type" should be deleted and "electrode" should read --electrodes--.
Line 46, "angle 2 (H) and" should read --angle 2 (H); and--.
Line 52, "angle 2$\theta$ a" should read --angle 2$\theta$a--.
Line 56, "formed" should read --are formed--.
Line 68, "smcctic" should read --smectic--.

UNITED STATES PATENT AND TRADEMARK OFFICE
CERTIFICATE OF CORRECTION

PATENT NO. : 4,941,736

DATED : July 17, 1990

INVENTOR(S) : OSAMU TANIGUCHI, ET AL.

It is certified that error appears in the above-identified patent and that said Letters Patent is hereby corrected as shown below:

COLUMN 21

Line 9, "(H) $\geq\theta>\theta$." should read --(H) $\geq\theta a>\theta$.--.

Signed and Sealed this

Seventeenth Day of March, 1992

*Attest:*

HARRY F. MANBECK, JR.

*Attesting Officer*     *Commissioner of Patents and Trademarks*